Patented Apr. 18, 1939

2,155,361

UNITED STATES PATENT OFFICE 2,155,361

PECTIN DISPERSION

Philip Bliss Myers, Scarsdale, N. Y., assignor to Sardik Incorporated, Jersey City, N. J., a corporation of Delaware No Drawing. Application April 15, 1938, Serial No. 202,231

13 Claims. (Cl. 167—68)

This invention relates to chemical compounds consisting principally of pectin, and to methods of preparing the same, an object of the invention being to provide a pectin compound characterized by novel properties which enable it to be employed to greater advantage than heretofore possible with pectin or its compounds.

I have discovered that if nickel be chemically combined with pectin in the proportion of about 0.1% to 1.0% by weight, a pectin body is obtained which easily hydrates and is rapidly dispersible in liquid media so that it may advantageously be used in place of ordinary pectin which is difficultly hydratable and of very low dispersibility. I have also found that this pectin body (nickel pectinate) is remarkably stable even in acid media, as fruit juices for example, and in this respect differs from other pectinates that are more dispersible than ordinary pectin; and that therefore said pectin body can be effectively used in such media while said others cannot.

On September 19, 1935, I filed a patent application (Serial Number 41,255) to cover this pectin body which was there defined and claimed as a compound of pectin and nickel wherein the proportion of nickel might vary within a range of from 0.1% to 0.5% of the pectin by weight. I am now filing this present application as a continuation in part of my earlier application Serial No. 41,255 to include what was disclosed and claimed in the original and to redefine the range of the nickel content in said pectin body to more fully accord with my actual invention, and also to disclose and claim herein a further discovery which I have made in respect of said pectin body and of other pectin bodies which I have prepared and tested.

Since, as stated, pectin is difficultly hydratable and dispersible in a liquid medium, as, for example, when added to fruit juices to make jellies, it requires substantial and continued agitation and, oftentimes, prolonged heating to become effective. In contrast to this, the nickel pectin body which I have discovered is readily dispersible in liquid media without any difficulty whatever and, in addition, remains stable despite acidity of such media.

To prepare this pectin body, I preferably add a solution of a nickel salt to a water dispersion of pectin, whereby, in the ensuing reaction, the nickel will replace the hydrogen in one or more of the carboxyl groups of the pectin, the number of said hydrogens so replaced depending upon the amount of nickel used. The nickel salt I prefer to use in this reaction is either nickel sulphate or nickel ammonium sulphate. From the reacting liquid the pectin body may be recovered by precipitation with alcohol and dried, or it may be recovered by separation from the reacting liquid in any suitable manner or, when it is not desired for commercial purposes to recover it in dry form, it may sometimes be used while still dispersed in the reacting liquid itself.

To provide nickel in an amount equal to 0.1% of the pectin requires approximately .4478 gram of nickel sulphate or .6729 gram of nickel ammonium sulphate, per 100 grams of dry pectin. For any other per centum of nickel required, the weights of these salts are easily calculable. With respect to the exact per centum of nickel to be used in any given case, I have found that, as a general rule, the maximum dispersibility of this pectin body occurs when nickel is present in the proportion of about 0.5%, although the grade of the pectin used and the acidity of the liquid medium in which the product is to be dispersed are factors which, to some extent, affect dispersibility. But while the presence of nickel in the pectin body in the proportion of about 0.5% generally secures the maximum dispersibility, for practical and commercial purposes I have found 0.3% to be entirely satisfactory. In general, I have found that with 0.1% of nickel present, the increase in the dispersibility of this product over that of pectin begins to be observable and that this increase becomes more noted, that is, is greater, as the proportion of nickel is increased up to about 0.5%, and that with the further increase of nickel the dispersibility of the product begins to decrease from its maximum until 1.0% of nickel is reached, at which point the dispersibility is substantially the same as that of pectin. But even at this point, the nickel pectinate remains readily hydratable. As the proportion of nickel is still further increased, the product will still hydrate but its dispersibility now falls below that of pectin and decreases proportionately with the addition of more nickel until the product eventually loses its colloidal form, coagulates and becomes nondispersible.

The pectin body prepared as above described, and which I have called nickel pectinate, may be used in all cases where ordinary pectin has heretofore been employed, as in the making of jellies from fruit juices, for example. It may, like pectin, be applied to such uses in the form of a liquid concentrate, or as a dry powder, or it may be prepared in the form of a film in the manner described with respect to pectin in Cowgill U. S. Patent No. 1,973,613, issued September 11, 1934. When used in film or powder form, and added to the liquid medium in which it is to be used, it will quickly hydrate, i. e., absorb liquid, and disperse itself rapidly throughout the liquid.

The other property of this pectin body which I have discovered and to which I have alluded above, is its toxicity to bacteria. This property makes it a valuable agent in the treatment of certain bacterial diseases and conditions in view of the fact that it is a colloidal salt whose molecules are too large to be absorbable through the membranes of the human body, wherefore it is non-toxic to the human body. When used for bactericidal purposes it is obviously unnecessary, unless desirable for special reasons, to recover the pectin body as a separate or dry product from the reacting liquid in which it is produced. The pectin body in any suitable form may be used for this purpose whether its dispersibility factor be high or low. Hence the proportion of its nickel content may be increased above 1.0%, that is, above the range within which the dry nickel pectinate is more dispersible than pectin. I have found that nickel pectinate containing only 0.2% nickel is toxic to micro-organisms. It should perhaps be observed that repeated tests with nickel pectinate in cultural media show that as the pH value of a cultural medium is increased the nickel pectinate becomes less and less toxic to micro-organisms; and that on the alkaline side, where the nickel pectinate becomes coagulated resulting in insolubility, there is no toxicity whatever.

I have also found that other pectinates may be prepared having this same property toxicity to micro-oraginisms by using, in the place of nickel, such other metals as lead, copper, manganese, cobalt, zinc and silver. For example, I have found that a pectinate containing about 0.3% of any of the metals here mentioned is toxic to micro-organisms, but it should be understood that this percentage may be decreased or increased depending upon the toxicity to bacteria of the selected metal and the effectiveness or strength desired for the resulting pectinate. All of these metals, as I have determined, will combine with pectin to form pectinates, in a reaction similar to the one described above in forming nickel pectinate I have made lead pectinate by adding lead acetate, copper pectinate by adding copper sulphate or copper acetate or copper chloride, manganese pectinate by adding manganese sulphate, cobalt pectinate by adding cobalt sulphate, binc pectinate by adding zinc acetate, and silver pectinate by adding silver nitrate, in the proper portions to a pectin dispersion. The compounds thus formed however are not, like nickel pectinate containing from 0.1% to 1.0% nickel, substantially more dispersible than pectin itself; but this is not essential when they are used for the purpose just referred to. Hence it is of no particular importance, when said compounds are so used, that the proportion of metal to pectin be within any particular range except that, in the case of each metal so combined, the metal must not be present in such an excessive amount as to completely destroy the dispersible colloidal character of the compound. This limit may be readily determined by experiment for each metal.

I have found that nickel pectinate, so long as it retains its colloidal form and contains at least 0.2% nickel, may be effectively used both internally and externally in the treatment of certain bacterial diseases affecting the human body. Nickel pectinate however will not retain its colloidal character if the proportion of nickel be increased to the limiting point where the product coagulates; but as I have already pointed out, its toxicity and effectiveness do not require a nickel content which even approaches this limit. For example, pectin containing from 0.3% to 0.6% nickel fed to a patient in sufficient quantity so that his intake of nickel is about 0.25 gram per day, has been found to be very successful in the treatment of bacilliary dysentery. In the example referred to, this daily ration was divided into three equal doses and administered at intervals during the 24 hours in cereals, soup, mashed potatoes, milk, beverages, water etc. In general, a patient suffering from acute or even chronic diarrhea rapidly returns to normal when fed this nickel pectinate. Besides such possible internal use as this, nickel pectinate, because of its antiseptic property, has been found to be an excellent substitute for sterile gauze in the packing of osteomyelitis chronic cavities. For such purpose, a 10% dispersion of the 0.3%–0.5% nickel pectinate has been found to produce excellent results in keeping a wound sterile, and promoting growth of tissue and rapid healing from the bottom of the wound to the surface. In general, such impregnated gauze may be used for bandages in the place of vasolined or oiled gauze dressings; and salves and ointments may be prepared from the nickel pectinate for application to rashes, skin diseases, cuts and wounds.

It will be apparent that the substitution of nickel or other metal for the hydrogen in the pectin molecule, in the desired proportion to produce the pectin compound of the present invention, can be accomplished in other ways than that specifically described above and that the present invention can be variously modified and adapted within the scope of the appended claims.

I claim:

1. The method of rendering pectin readily dispersible in water, fruit juices and the like, which consists in reacting the pectin with a soluble nickel salt used in such proportions relative to the pectin that the amount of nickel present for combination with the pectin will be from one-tenth of one percent to one percent of the total weight of the nickel and pectin so combined.

2. A dry pectin compound readily dispersible in water, fruit juices and the like, comprising pectin and nickel combined chemically as a pectinate and wherein the proportion of nickel is not greater than one percent.

3. A dry pectin compound readily dispersible in water, fruit juices and the like, which is derived as the product of reacting a pectin dispersion with a nickel salt in such proportions that the amount of nickel in said product will not be less than one-tenth of one percent and not greater than one percent of the combined weight of the pectin and nickel.

4. A dry pectin compound readily dispersible in water, fruit juices and the like, comprising pectin and nickel combined chemically as a pectinate and wherein the proportion of nickel is between one-tenth of one percent and one percent.

5. A dry pectin compound readily dispersible in water, fruit juices and the like, comprising pectin and nickel combined chemically as a pectinate and wherein the proportion of nickel is substantially three-tenths of one percent.

6. A composition of matter in solid or powder form comprising pectin in which nickel is combined with one or more of the carboxyl groups in the pectin molecule in an amount equal to from one-tenth of one percent to five-tenths of one percent of the pectin by weight.

7. A colloidal bactericide comprising pectin and a metal whose ions are toxic to bacteria and which is capable of combining with the pectin to form a compound dispersible in water, the proportion of the metal to the pectin and metal combined being less than enough to coagulate the pectin in a water dispersion.

8. A colloidal bactericide comprising pectin and at least one of the metals from the group consisting of nickel, lead, copper, manganese, cobalt, zinc and silver, the proportion of the metal to the pectin and metal combined being less than enough to coagulate the pectin in a water dispersion.

9. A colloidal bactericide comprising pectin combined with nickel in such relative proportions that the compound thus formed is dispersible in water and wherein the proportion of the nickel to the pectin and nickel combined is not less than about two-tenths of one percent.

10. A colloidal bactericide comprising pectin combined with silver in such relative proportions that the compound thus formed is dispersible in water.

11. A bactericidal agent formed by adding a salt of at least one of the metals from the group consisting of nickel, lead, copper, manganese, cobalt, zinc and silver, to a pectin dispersion in such proportions that the proportion of the metal to the pectin and metal combined will be less than enough to coagulate the pectin.

12. A bactericidal agent formed by adding a nickel salt to a pectin dispersion in such proportions that the proportion of the nickel to the pectin and nickel combined will not be less than about two-tenths of one percent and not great enough to coagulate the pectin.

13. A bactericidal agent formed by combining a silver salt with a pectin dispersion in such proportions that the proportion of the silver to the pectin and silver combined will be less than enough to coagulate the pectin.

PHILIP BLISS MYERS.